FIG_1_

FIG_2_

FIG_3_

INVENTORS
Richard A. Edwards.
Eugene E. Reynolds.

BY Samuel E. Turner

Jan. 16, 1962    R. A. EDWARDS ETAL    3,017,088
CALCULATING MACHINES

Filed Nov. 13, 1956    7 Sheets-Sheet 3

INVENTORS
Richard A. Edwards.
Eugene E. Reynolds.

BY Samuel E. Turner

INVENTORS
Richard A. Edwards.
Eugene E. Reynolds.

BY Samuel E. Turner

Jan. 16, 1962        R. A. EDWARDS ETAL        3,017,088
CALCULATING MACHINES
Filed Nov. 13, 1956                      7 Sheets-Sheet 5

FIG. 10.

INVENTORS
Richard A. Edwards.
Eugene E. Reynolds.

BY Samuel E. Turner

FIG_11_

FIG_12_

Jan. 16, 1962     R. A. EDWARDS ETAL     3,017,088
CALCULATING MACHINES

Filed Nov. 13, 1956     7 Sheets-Sheet 7

FIG.13.

INVENTORS
Richard A. Edwards.
Eugene E. Reynolds.

BY Samuel E. Turner

United States Patent Office 3,017,088
Patented Jan. 16, 1962

3,017,088
CALCULATING MACHINES
Richard A. Edwards, Walnut Creek, and Eugene E. Reynolds, Richmond Annex, Calif., assignors to Smith-Corona Marchant Inc., a corporation of New York
Filed Nov. 13, 1956, Ser. No. 621,603
2 Claims. (Cl. 235—145)

The present invention relates to calculating machines and particularly concerns a calculating machine which includes automatic dual keyboard entry mechanism, split clearance mechanism for the product register and means for automatically rounding off a value accumulated in one part of said register.

The preferred embodiment of the invention is disclosed herein as a part of a machine having a plurality of banks of depressible numeral keys such as shown in U.S. Patent Nos. 2,271,240 and 2,583,377. Associated with each key bank is a V-slot bar having cam-edged notches, one notch for each key in the bank. When a selected key is depressed, a stem of this key engages a respective cam edge to move the V-slot bar a distance proportionate to the key value.

The present invention provides a dual-entry mechanism which may be rendered operative to interconnect certain pairs of the V-slot bars of the keyboard. By means of such interconnections, one pair of V-slot bars will move together in response to the depression of a single key, thereby providing automatic dual-entry of the key value.

Mechanism is also provided for disabling the clearance mechanism for certain ones of the numeral wheels in the product register of the calculator. This device which is sometimes referred to as "split-clearance" mechanism, together with the automatic dual entry mechanism, simplifies and reduces the number of manual operations of the keys in order to perform a series of calculations with clearance of individual extensions and subtotals in one part of the register and accumulation of a grand total in the other part of the register.

The present invention further includes what is generally referred to as a "half-cent round-off" mechanism which provides automatic round-off of each extension and accumulation of the grand total. This is accomplished in the crawl-carry register, illustrating a part of the present invention, by providing an alternative "zero stop" for one of the product register dials whereby that dial is automatically set up or restored to "5" upon operation of the clearance mechanism.

It is an object of the present invention to accumulate automatically rounded off extensions of a series of results.

Another object of the invention is to register separate extensions and simultaneously therewith to accumulate automatically rounded off extensions all in a single register.

It is a further object to interconnect certain pairs of ordinal value entry mechanisms and to lock the numeral keys associated with one of each of said pairs automatically upon effecting such interconnection.

It is another object to provide an improved half-cent round-off mechanism for a crawl carry register.

Other objects and advantages of the invention will be apparent from the following description, reference being had to the accompanying drawings, in which.

DUAL-ENTRY MECHANISM

When a numeral key 100 (FIG. 2) is depressed, the bottom of the key stem 103 contacts its associated cam surface of a notch 131 in a V-slot or selection bar 508. Since the selection bar 508 is suspended for endwise movement by a pair of parallel links 128 and 129, further depression of key 100 cams the selection bar 508 to the right, as viewed in FIG. 2, by an amount proportional to the value of the key 100. Through a notch and stud connection, the endwise movement of the selection bar 508 is transmitted to a rockable segment 132. The upper portion of segment 132 is geared to a keyboard check dial 140 which is rotated to indicate, through a sight opening 147 (FIG. 1), the value of the key depressed. The lower portion of segment 132 (FIG. 2) is geared to a cam unit 146 forming a part of selection mechanism which controls the differential actuators for subsequent entry of a value into the product register of the calculator. A description of this selection mechanism, actuators and register, as well as a more complete description of the keyboard, may be found in the above-mentioned Patents Nos. 2,271,240 and 2,583,377.

Figure 2:
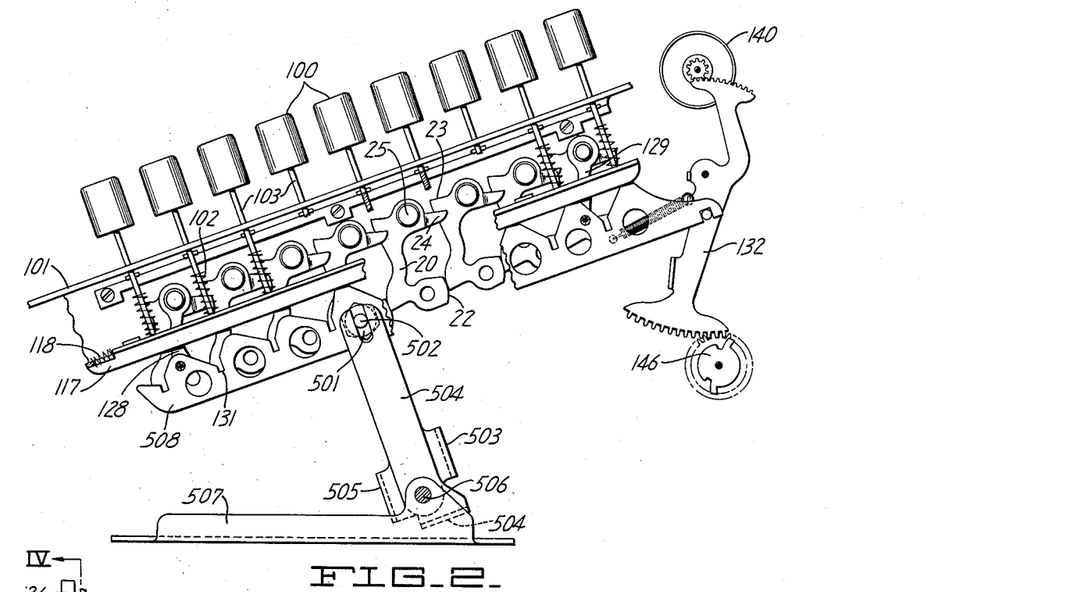
FIG. 2 is a right-side view, partly in cross-section, of the keyboard mechanism showing portions of the keyboard selection and dual-entry mechanism.
Figure 3:
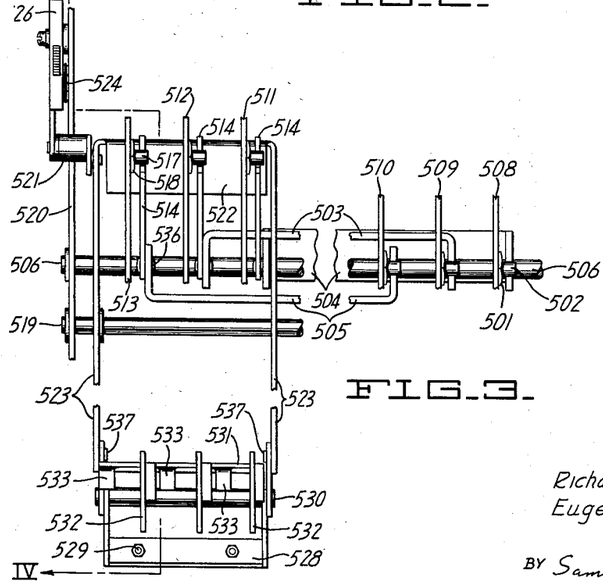
FIG. 3 is a plan view of the dual-entry mechanism.

It is assumed that the present machine has a keyboard of ten-key banks. FIG. 2 is a right-side view of the rightmost key bank and FIG. 3 is a plan view of the dual-entry mechanism showing the selection bars of the three rightmost and the three leftmost key banks. The three selection bars on the right are numbered 508, 509 and 510 and their associated bars on the left are numbered 511, 512 and 513 respectively. As is evident from FIGS. 2 and 3, a bail 504 forms a connection between selection bars 508 and 511. Similar connections are formed by a bail 503 between selection bars 509 and 512 and by a bail 505 between selection bars 510 and 513. On the right side, each bail 508, 509 and 510 is adjustably connected to its selection bar through a stud 502 (FIGS. 2 and 3) and eccentric nut 501. A respective setting link 514 (FIGS. 3 and 4) is pivoted on the left side of each bail at 536 and each link is, in turn, connected to a respective selection bar on the left side of the keyboard by means of a stud 517 eccentrically mounted on a nut 518.

Figure 4:
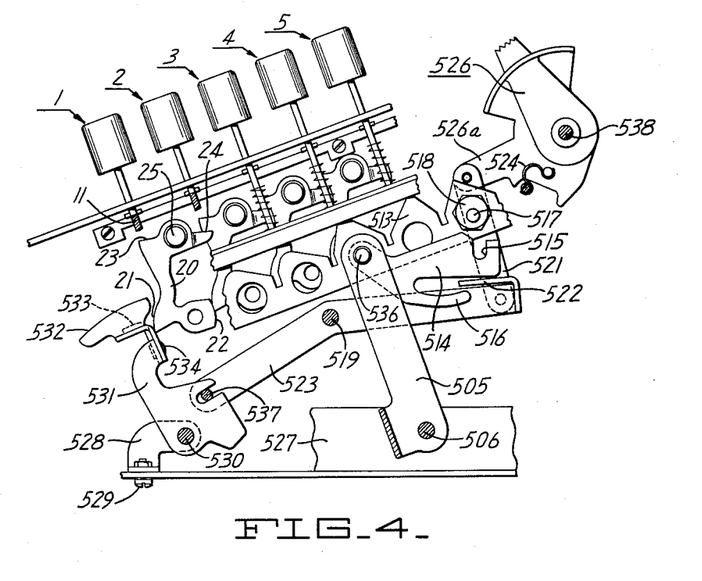
FIG. 4 is a right-side view partly in cross-section, of a portion of the left-most key bank taken along the line 4—4 of FIG. 3 and showing a part of the dual-entry mechanism including the dual-entry control lever.

The setting links for all the selection bars on the left section of the keyboard are connected and disconnected at will by the machine operator so a value may be set up on the left side of the keyboard when the links are disconnected, and so the dual entry mechanism may be enabled by the operator when the links are connected. As illustrated in FIG. 4, setting link 514 is out of engagement with stud 517 such as when the dual entry mechanism is disabled. If, under this condition, a key is depressed in the third key bank from the right, for example, the movement of selection bar 510 (FIG. 3) causes bail 505 to rock clockwise, as viewed in FIG. 4, about the bail pivot shaft 506. Setting link 514 moves to the right, but since it is in its downward or disabled condition, it is ineffective to set the selection bar 513 in that order and thus permits that bar to be set by its numeral keys in the normal way. To bring the dual-entry mechanism into operation there is provided a bail 522 (FIGS. 3 and 4) underlying all the setting links 514. This bail is supported by two arms 523 pivotally mounted on a shaft 519. A manually settable dual-entry control lever 526 (FIGS. 3 and 4) is mounted for rocking motion at 538 (FIG. 4) and is retained in either of two positions by a toggle spring 524 (FIG. 4) attached at one end to a stud on a machine frame member and at its other end to a stud on the control lever. Control lever 526 projects through a slot in the machine cover for manual operation thereof as shown to the left of the keyboard in FIG. 1. An arm 526a of the control lever is connected to the bail 522 by a link 521.

Clockwise motion of the control lever 526 operates, through bail 522 (FIG. 4) to urge the setting links 514 upward and to bring a slotted portion 515 of each link into engagement with the studs 517 thus enabling the connection between the pairs of selection bars. A clockwise motion of bail 505 in response to the depression of a numeral key in the third key bank from the right causes rightward movement (FIG. 4) of the leftmost selection bar 513, through the setting link 514 and stud 517; i.e., selection bars 510 and 513 (FIG. 3) move together to provide dual entry of the selected value. Similarly, the depression of a key in the second from left key bank causes selection bars 509 and 512 to move together and depression of a key in the rightmost key bank causes selection bars 508 and 511 to move together.

When the control lever 526 is moved counterclockwise to the position shown in FIG. 4, bail 522 bears against an extension 516 of each setting link 514 to positively disengage these links from their respective studs 517 thereby rendering the dual-entry mechanism inoperative.

In the illustrated embodiment of the present invention, mechanism is provided to lock the keys of the three leftmost key banks (FIGS. 1 and 3) to prevent possible jamming of the keyboard when the machine is set for dual entry of values, and a value is set in the righthand section of the keyboard. Then depression of one or more of the three leftmost banks of keys is prevented by the lock. This mechanism is shown in FIGS. 3 and 4 and comprises a locking bail 531 which is supported for rocking motion by brackets 528 and a shaft 530. The brackets are fixed to the framework by screws 529. The locking bail 531 is rocked clockwise by studs 537 engaged in their respective slots in the locking bail as shown in FIGS. 3 and 4. These studs are attached to arms 523 which support bail 522. When the dual-entry control lever is moved clockwise to enable the dual-entry mechanism, the arms 523 rock counterclockwise. Consequently, the locking bail 531 is rocked clockwise to a position in which each blocking surface 533 (FIGS. 3 and 4) engages a heel surface 21 of a key interlock bellcrank 20 (FIG. 4).

A complete description of the bellcrank key interlock system may be found in the above-mentioned Patent No. 2,583,377. It is sufficient to understand, for the purpose of this description, that there is a series of interlock bellcranks 20 associated with each bank of numeral keys. Each bellcrank is mounted for rocking motion on a stud 25 (FIG. 4), and a toe 22 of each bellcrank contacts the heel of the next bellcrank so that when the blocking surface 533 of the locking bail 531 engages the heel 21 of bellcrank 20, all of the bellcranks in the three leftmost banks of the keyboard are urged counterclockwise and are then held in a rightward or counterclockwise position. In this position of the bellcranks, a shoulder 24 (FIG. 4) of each bellcrank is raised to engage an extension 11 of the key stems and prevents depression of keys 2 to 9. The number 1 keys are blocked by surfaces 532 (FIGS. 3 and 4) which move under the bottom of the stems of the number 1 keys when the locking bail 531 moves clockwise.

SPLIT-CLEARANCE

The product register of the present machine is described in the aforementioned Patent No. 2,271,240, under the heading Accumulator Mechanism and it will be assumed that the machine embodying the present invention includes a twenty order product register disclosed in that patent. The mechanism for entering particular values into the product register will not be described here since the actuating mechanism for the register forms no part of the present invention. However, that actuating mechanism is disclosed in the above-mentioned Patent No. 2,271,240 to which reference may be made if it is desired to do so.

The description in this section of the specification will be confined to the construction and operation of the mechanism for clearing a value from the register and returning the dials to zero position. This section will also describe how the clearance mechanism is divided into two separate units, either one of which may be disabled to prevent the clearance of a value from its respective section of the register.

Figure 5:
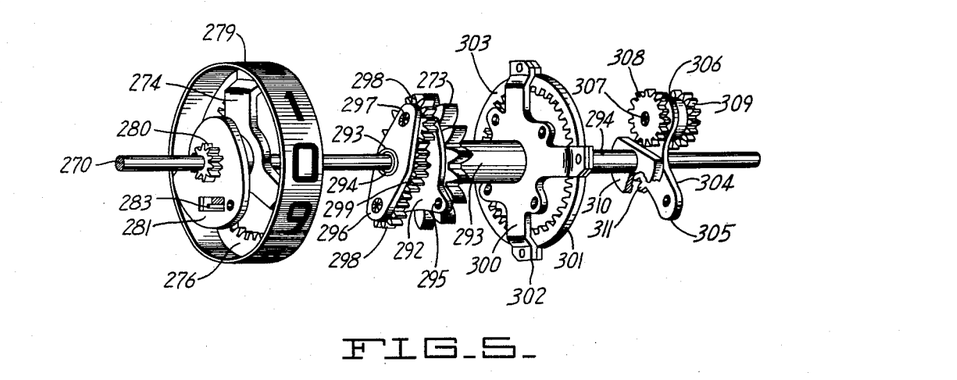
FIG. 5 is an exploded perspective view of one order of the product register.

Referring now to FIG. 5, a sun gear 280 and the carrier 274 for the numeral wheel 279 are fixed to a sleeve which is mounted for free rotation upon a shaft 270. Fixed to the carrier 274 is an internal ring gear 276 and the numeral wheel 279. A right angular extension 278 (FIG. 11) of one of the carrier arms projects toward the right from the numeral wheel and forms a zero stop lug which is used in clearance operations.

A plate 292 (FIG. 5) and a spur gear 273 are fixed together and are rotatably mounted on a sleeve 293 which is, in turn, rotatably mounted on a sleeve 294. Attached to plate 292 is a pair of studs 297, each carrying a planet gear 298. A sun gear 299 is formed integrally with sleeve 293 and meshes with the planet gears 298. Gears 298 and 299 are held in place by a plate 296 fixed to the aforementioned studs 297. Planet gears 298 are adapted to mesh with the numeral wheel ring gear 276. Thus spur gear 273, plate 292, planet gears 298 and ring gear 276 constitute a planetary assembly, which rotates about the sun gear 299. A gear 273 is also fixed to the planetary assembly and is driven by an actuating mechanism which operates through spur gear 273 to rotate the numeral wheel 279 to register a selected value in a manner described in said Avery Patent No. 2,271,240.

Attached to the right end of sleeve 293 (FIG. 5) is an intermediate carrier 300 for an internal ring gear 301. The carrier 300 and ring gear 301 are formed with a lug at the extremity of each arm of the carrier and these lugs 302 serve as limit stops during the clearance operations.

Formed integrally with the aforementioned sleeve 294 and near its right end is a spacer 310 and abutting this spacer and fixed to sleeve 294 is what may be referred to as a rocking idler 304, which has a gear segment 311 formed on one section and a pair of integral idler gears 308 and 309 mounted on another section thereof by means of a common stud 307. Gear 308 meshes with internal gear 301 while gear 309 meshes with the sun gear 280 of the next lower order, i.e., the sun gear of the dial unit next to the right. Thus, the meshing of idler gear 309 with the sun gear 280 of the next lower order provides a connection between the dial units or denominational orders of the register, and is for the purpose of tens carry. A complete description of the manner of operation of the tens carry mechanism may be found in the Avery Patent No. 2,271,240.

Carried for rocking motion on a shaft 272 (FIG. 8) is a segment member 313 which is formed with a gear segment 312 in mesh with the segment 311 of rocking idler 304. Member 313 is also formed with a lateral extension 356 which overlies tip 357 of a pawl 319.

Figure 8:
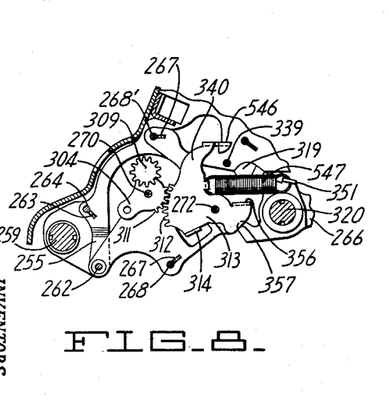

During a clearance operation, pawl 319 is rocked clockwise and then back to the position shown in FIG. 8. During this clockwise motion, the tip of pawl 319 engages the lateral extension 356 and rocks member 313 counterclockwise. In so doing, the segment 312 operates through the segment 311 and rocks rocking idler 304 clockwise, as shown in FIG. 8 or counterclockwise as viewed in FIG. 5. If the ring gear 301 (FIG. 5) is meanwhile locked against movement, the motion of rocking idler 304 feeds idler gear 308 over the teeth of the locked ring gear and causes gears 308 and 309 to rotate about their center 307.

Figure 6:
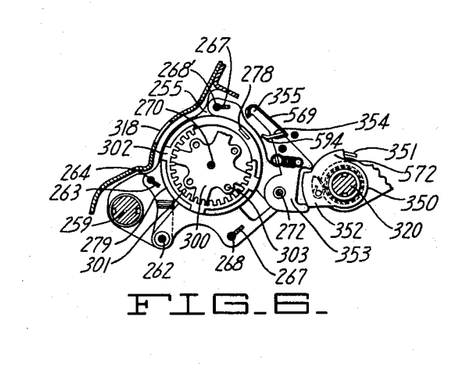
FIGS. 6 and 8 are sections taken through the carriage to illustrate the construction of the product register.

Pawl 319 (FIGS. 8 and 10) is spring urged counterclockwise and its upper tip normally engages a gear 271 (FIG. 10), to thereby restrain that gear and hence gear 273 against movement. When pawl 319 is rocked clockwise during a clearance operation, the upper tip is withdrawn from engagement with gear 271 and, therefore, gears 271 and 273 are released. With gear 273 of each order of the register released for movement, the rotation of each gear 309 (FIG. 5), as described above, operates through sun gears 280 to drive the numeral dials backwardly toward their "0" positions. A stopping means is placed in the path of the previously mentioned lugs 278 (FIGS. 6 and 10) to prevent the numeral wheels from being driven beyond zero position. The mechanism for stopping the numeral wheel and for locking ring gear 301 includes a locking lever 353 (FIG. 6) formed with a zero stop extension 354. Locking lever 353 in each order is rocked upon its supporting shaft 272 by a lever 350 (FIG. 6) which is formed with an extension 352 that engages a U-shaped cutout portion of the locking lever. Lever 350 is keyed to a clearance shaft 320 (FIG. 6) which shaft is rocked clockwise and back to the position shown in FIG. 6, during each clearance operation. Lever 353 is therefore rocked counterclockwise during the clockwise rocking of shaft 320 and in so doing, it brings extension 354 (FIG. 6) into the path of the lug 278 on the numeral dial. Concurrently, a tip 594 (FIG. 9) of extension 354 comes into the path of one of the lugs 302 (FIG. 5) to block ring gear 301. A resilient tip 355 is carried by locking lever 353 and latches over the lug 278 to prevent rebound of the numeral dial.

Figure 10:
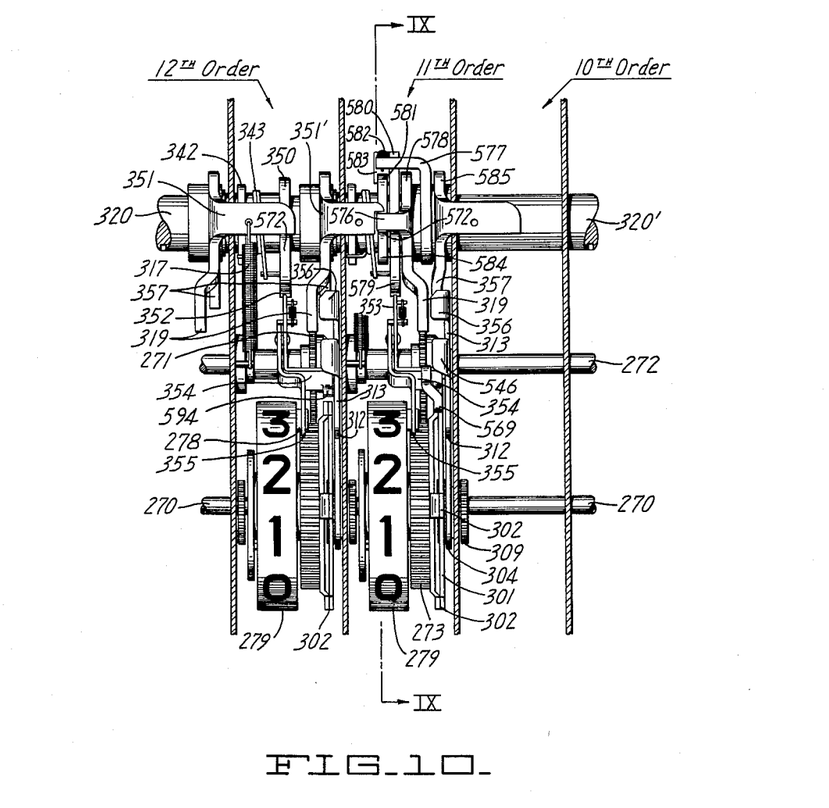
FIG. 10 is an enlarged top view of the product register clearance mechanism for providing split-clearance of the left and right sections of said register.

Lever 350 (FIG. 6) is formed with another extension 572 which serves to operate the previously mentioned pawl 319, (FIG. 8). As shown in FIG. 10 each pawl 319 is formed with a lateral projection 351 which projects into the path of an extension 572. Thus when rocking lever 350 is rocked by the clearance shaft 320, pawl 319 is rocked therewith.

Figure 7:
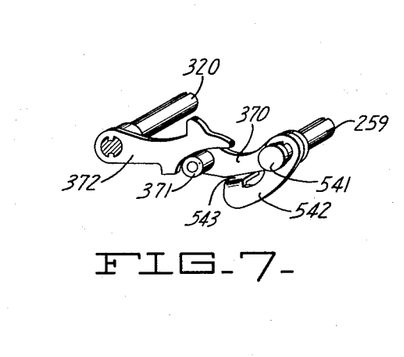
FIG. 7 is an illustration of the split-clearance enabling and disabling mechanism.

The clearance shaft 320 is rocked to perform a clearance operation by power driven mechanism which responds to depression of a manually operable clear key. This mechanism includes a cyclic clear clutch, an electric motor therefore and a power transmission from the clutch to a clearance drive shaft 259 (FIG. 6) all of which are fully described in the Avery Patent No. 2,271,240. During a single cycle of operation of the clear clutch, the drive shaft 259 is rocked approximately 30 degrees clockwise and back to the position shown in FIG. 7. Keyed to shaft 259 is an arm 542 which is formed with a projection 543. This projection normally underlies an arm 370 which is freely supported by shaft 259. Arm 370 carries a roller 371 positioned to engage an arm 372 which is keyed to the clearance shaft 320. When the clearance drive shaft 259 is rocked, arm 542 is rocked therewith and the lateral extension 543 picks up arm 370 thereby rocking clearance shaft 320 through roller 371 and arm 372 to perform a clearance of the product register in the manner previously described. An arrangement of arms like that shown in FIG. 7 is fitted to shafts 259 and 320 at the right-hand and left-hand sides of the carriage.

Figure 1:
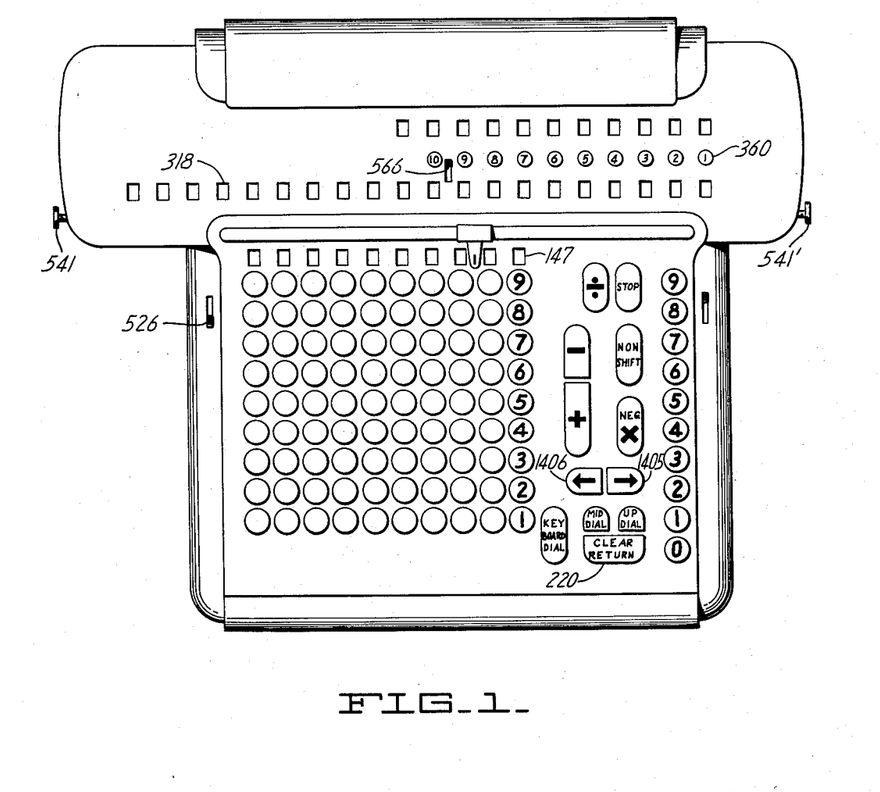
FIG. 1 is an exterior plan view of the machine embodying the present invention, showing the keyboard, carriage and the several controls.

In the present machine, the clearance shaft 320 is divided into two separately operable parts designated 320 (FIG. 10) for the left and 320' for the right half of the register. Arm 542 and the similar arm on the right side are keyed to the clearance drive shaft in a manner to allow limited longitudinal movement. Fixed to each arm 542 is a knob 541 (FIG. 7) and 541' respectively, which protrudes through the carriage cover as shown in FIG. 1. Either knob 541 or 541' may be pulled outwardly to move its lever 541 by the amount of the abovementioned limited longitudinal movement which is sufficient to allow the projection 543 to clear lever 370 when the clearance drive shaft 259 is rocked, thereby preventing the actuation of shaft 320 when knob 541 is pulled outwardly, or of shaft 320' when knob 541' is pulled outwardly. In this way, a value may be cleared from one half of the register without disturbing an accumulation of a series of values in the other half of the register. The split in the clearance shaft is usually made in the 11th order of a twenty order register to obtain the standard "10–10" split and the following modifications to the 11th order dial unit become necessary for effecting this split. It will be recalled from the previous discussion of the clearance operation that idler gear 308 (FIG. 5) is driven over the locked ring gear 301 causing rotation of idler gear 309 which, through sun gear 280, rotates the numeral wheel of the next lowest order backward toward its zero position. Specifically, the ring gear 301 of the 11th order (FIG. 9) must be blocked to cause clearance of the 10th order. The clearance mechanism of the 11th order is therefore modified so that locking lever 353 (FIG. 10) is operated when either half 320 or 320' of the clearance shaft is rocked during a clearance operation.

Whereas the normal rocking lever 350, as in the 12th order (FIG. 10) is keyed to rock with the clearance shaft, the dial unit in the 11th order has a special rocking lever 579 which is freely mounted on a sleeve (not shown) which bridges shafts 320 and 320'. Lever 579 includes an extension 580 (FIGS. 9 and 10) upon which is formed a projection 583. An operating member 577 is keyed to shaft 320' and has a lateral extension which overlies the extension 580 of rocking lever 579. A spring 582 (FIG. 10) takes up the lost motion between these two members. Keyed to shaft 320 is another operating member 584 (FIGS. 9 and 10) which has a rearward tip 581 overlying the projection 583. As is shown most clearly in FIG. 9, when the clearance shaft 320 is rocked counterclockwise, tip 581 engages projection 583 to thereby impart the rocking motion to the special rocking lever 579. Likewise, when clearance shaft 320' is rocked (FIG. 10) the lateral extension of member 577 engages the extension 580 to also impart the rocking motion to the special rocking lever. In other words, the special rocking lever 579 (FIGS. 9 and 10) is operated upon actuation of either clearance shaft 320 or 320'. Thus when shaft 320' is actuated to clear the 1st through 10th orders of the register, the motion of special rocking lever 579 brings the ring gear blocking tip 594 (FIGS. 9 and 10) of locking lever 353 of the 11th order into engagement with one of the lugs 302 of ring gear 301 (FIG. 10) as is necessary for clearance of the 10th order. Similarly, when shaft 320 is actuated to clear the 11th through 20th orders, the special rocking lever 579 is again rocked, but for the purpose of bringing extension 354 into the path of the zero stop lug 278 in the 11th order and for latching the live tip 355 over the lug 278 to prevent rebound of the numeral wheel when the 11th order is cleared.

Figure 9:
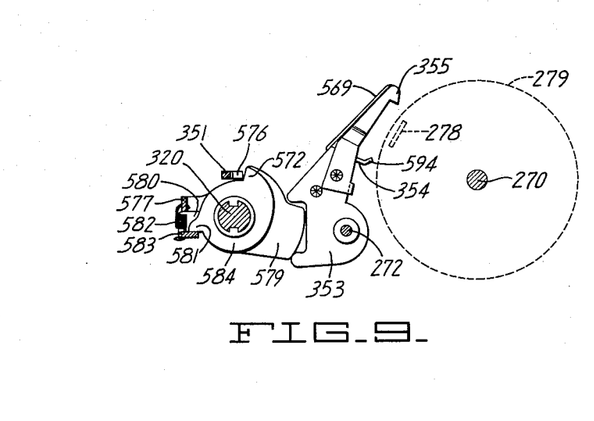
FIG. 9 is a left-side sectional view of the split-clearance mechanism taken along the line 9—9 of FIG. 10.
Figure 13:
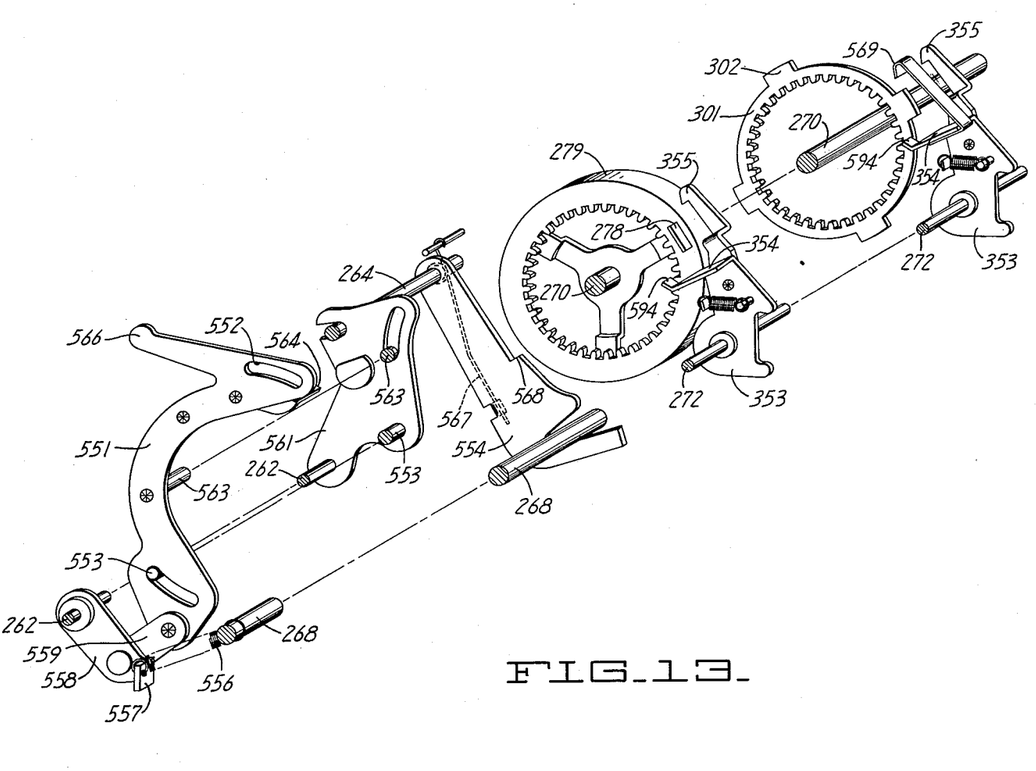
FIG. 13 is an exploded perspective view of the round-off mechanism.

It may be noted that a ring gear stopping tip 569 is shown in FIGS. 9, 10 and 13 attached to the rear of extension 354 of locking lever 353. This resilient tip 569 is best shown in FIG. 13 and its purpose is to latch over lug 302 and to thereby prevent counterclockwise rotation (as seen in FIG. 13) of ring gear 301 during half-cent round-off operations described hereinafter.

ROUND-OFF MECHANISM

The present calculating machine includes mechanism peculiar to a crawl-carry type register for automatically rounding off a value to the nearest five tenths. Where the product register is split for clearance between the 10th and 11th orders, as it is in the present example, the round-off mechanism is associated with the 10th order dial unit; i.e., in the highest order of the right half of the register. Mechanism is provided in this 10th order for bringing the numeral wheel in that order to its "5" position upon any clearance operation of the right half of the register.

In the proper manner of operation of the machine embodying the present invention, the dual-entry mechanism is enabled so that extensions are simultaneously entered into both the right and left halves of the register during the same machine operation. The clearance mechanism associated with the left half of the register may be disabled selectively by the operator so that extensions may be accumulated to a grand total in this part of the register while allowing the clearance of individual extensions from the right half of the register. The round-off mechanism to be described operates to round off each extension which is entered into the left half of the register and in this way a correct grand total is provided. To accomplish the above result it is necessary that the carriage be lined up to place the decimal point of the extensions, which are entered into the left half of the register, between the 12th and 13th orders. This places the tenths of cents or mills order of the extension in the 10th order dial which is the order containing the round-off mechanism. For example, if a value $4.687 is entered with the decimal point between the 12th and 13th orders, then the round-off "5" in the 10th order combines with the "7" in the fractional cent position of the example value and causes a carry to the 11th order. Thus the value is rounded off to $4.69. A value such as $4.683, however, rounds out to $4.68 since the "3" in the fractional cent position of the value and the "5" contained in the 10th order do not, of course, cause a carry.

It should be noted that the carriage may be shifted to the right and left in the conventional manner under the control of the shift keys 1405 and 1406; however, since there is a distinct relationship between the round-off order of the carriage and the dual entry keyboard, it is more convenient to depress a selected tab key 360 and, at the end of all calculating operations involving a shift, to return the carriage to the selected tab position under the control of the clear return key 220. The determination of which tab key 360 is depressed is controlled by the number of digits in the multiplier factor. If a single digit multiplier is used, then the #4 tab key is depressed to align the round-off order of the carriage with the "mills" order of the left portion of the dual entry keyboard. If two multiplier digits are used then the #5 tab key is depressed, etc., the rule being that at the time the last multiplier digit is entered, the round-off order of the register must be aligned with the mills order of the keyboard, as above described.

The return-tabulate mechanism employing the use of the ordinal tab keys and the clear return key is similar to that disclosed in the Dustin Patent No. 2,428,206, issued September 30, 1947; however, other tabulation mechanisms of known commercial construction may be employed to effect such return of the carriage to a predetermined position.

A description of the construction and operation of the round-off mechanism now follows. Mounted adjacent the numeral wheel 279 (FIG. 11) of the 10th order dial unit is a stop member 554 which is mounted for rocking motion on a rod 264. A spring 567 (FIG. 13) urges member 554 in a counterclockwise direction to thereby bring a step 568 into the path of the lug 278 of the numeral wheel. This step 568 forms the stop for arresting the numeral wheel in its "5" position as it is being driven by means presently described. Member 554 is limited in its counterclockwise movement by engagement with a rod 268. When the carriage is dipped during actuation, as described in Patent No. 2,271,240, the rod 268 rocks member 554 clockwise by an amount sufficient to allow the lug 278 on the numeral wheel to clear the step 568, thereby allowing free movement of the numeral wheel for the entry of values.

Figure 11:
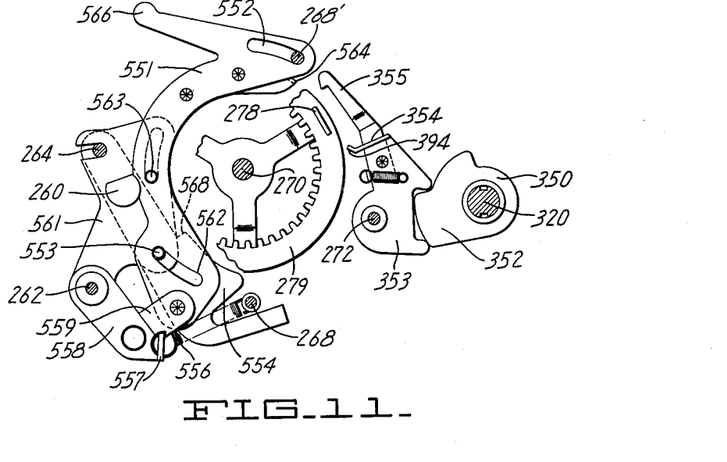
FIG. 11 is an enlarged right-side view of the round-off mechanism.

It will be recalled that in a normal clearance operation, live tip 355 latches over lug 278 and prevents counterclockwise movement of the numeral wheel from its zero position. To allow the numeral wheel to rotate to its "5" position, live tip 355 must be disabled, and for this purpose there is provided a round-off control lever 551 (FIG. 11) which is supported for arcuate motion upon the rods 268', 553 and 563. An arm 566 of the lever 551 protrudes through the carriage cover as shown in FIG. 1 and may be manually adjusted to bring a lateral surface 564 (best seen in FIG. 13) into the path of tip 355, thereby preventing it from latching over lug 278 of the numeral wheel and thus enabling the round-off mechanism. Lever 551 is retained in either of two positions by a toggle action consisting of a pair of links 558 and 559 and a spring 556 (FIG. 11). A plate 561, which is supported on rods 262 and 264, acts as a support member for lever 551 and for the toggle mechanism.

When the clearance mechanism is operated with the round-off mechanism in enabled condition, the numeral wheel of the dial unit containing the round-off mechanism is first driven to its zero position as in any clearance operation and then counterclockwise to its "5" position in the following manner. It will be recalled that clearance shaft 320 is rocked clockwise, as shown in FIG. 8 during the first part of a clearance cycle. Pawl 319 is rocked clockwise with shaft 320 causing tip 357 of the pawl to engage the lateral extension 356 of member 313. Member 313 is thereby rocked counterclockwise, tensioning spring 547 and driving the rocking idler 304 clockwise to return the numeral wheel to its zero position as previously described.

Figure 12:
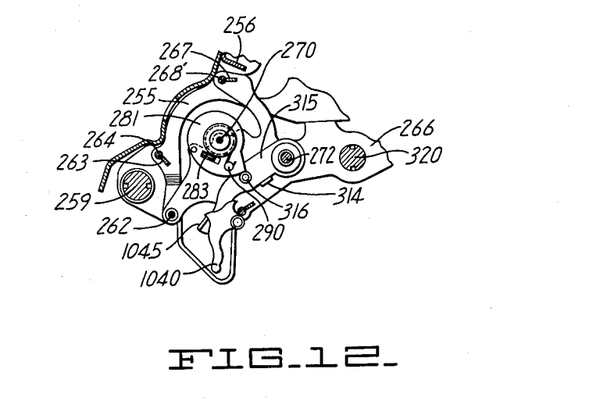
FIG. 12 is a cross-section taken through the carriage to illustrate the construction of the product register.

When the clearance shaft 320 is rocked back to its initial position shown in FIG. 8 during the second part of the clearance cycle, member 313 tends to rock clockwise under the influence of spring 547 by an amount which is normally limited by the projection 314 of member 313 and a cam sensing lever 315 (FIG. 12). Lever 315 carries a roller 316 adapted to engage a snail cam 281 which is mounted for rotation with the numeral wheel as shown in FIG. 5. The snail cam 281, lever 315 and roller 316 comprise mechanism for properly aligning the numeral wheels with the sight openings in the carriage cover as described in Patent No. 2,271,240.

When the roller 316 contacts the cam 281 most of the force of the tensioned spring 547 is taken up in forcing the roller against the cam. To perform the round-off operation, the roller 316 is prevented from contacting the cam and the tension of spring 547 is utilized to drive the numeral wheel to its "5" position as follows. Normally, counterclockwise movement of the numeral wheel is prevented by the live tip 355 (FIG. 6) which is latched over the zero stop projection 278 of the numeral wheel until pawl 319 (FIG. 8) engages gear 271 which then prevents movement of the numeral wheel after the live tip is disengaged. Thus, under normal clearance operation, ring gear 301 (FIG. 6) moves counterclockwise to allow roller 316 to contact the cam 281 since either the numeral wheel or the ring gear must move in order to allow movement of member 313.

Under the foregoing condition, with the ring gear 301 blocked against movement and the numeral wheel released for counterclockwise movement by disabling the live tip 355 as described above, then the spring 547 will drive the numeral wheel counterclockwise through member 313 and idler 304, and gears 308, 309 and 280. The roller 316 under these conditions does not contact the cam 281, because the counterclockwise movement of the numeral wheel carries the cam 281 to positions of continually decreasing radius with respect to the roller. Therefore, the entire energy of the spring is available to drive the numeral wheel counterclockwise from its "0" position to the "5" position, at which time the previously mentioned step 568 (FIG. 11) engages the lug 278 of the numeral wheel and prevents further counterclockwise rotation. The blocking of the ring gear 301 of the 11th order dial unit as is required to bring about the above operation is accomplished by the live tip 569 (FIGS. 9 and 13) which is attached to extension 354 of locking lever 353 of the 11th order and is adapted to latch over lug 302 of the ring gear when this lug is forced against blocking tip 594 during the first part of the clearance cycle.

In the above-described manner the numeral dial of the 10th order is returned to its "5" position with each clearance operation of the right half of the product register.

EXAMPLE OF OPERATION

A machine embodying the features of the present invention facilitates many of the calculations required in business and an example of the machine operation will more clearly show its utility and advantages of the features of the present machine. The following is an example of a typical freight invoice wherein different rates are charged for the various classes of cargo. As previously explained, extensions are automatically rounded off and accumulated to a grand total in the left half of the product register while individual extensions appear in the right half of the register. The individual extensions may be easily rounded off mentally and manually transcribed by the operator, after which the right half of the register is then cleared in preparation for the calculation of the next extension. The column below which is headed Extension (not rounded off) is included to illustrate that an accumulation of extensions without individually rounding them off leads to an error in the grand total as compared to the sum of the extensions which are rounded-off individually.

Example

| Weights | Rate | Extension (rounded off) | Extension (not rounded off) |
|---|---|---|---|
| 759 lbs | at 1.25 per cwt | 9.49 | 9.4875 |
| 156 lbs | at 5.41 per cwt | 8.44 | 8.4396 |
| 977 lbs | at 2.15 per cwt | 21.01 | 21.005 |
| Grand Total | | 38.94 | 38.9321 |

OPERATION (1) The total is accumulated in the left half of the product register. Therefore, the clearance release knob 541 (FIG. 1) is pulled outward to prevent clearance of the left side.

(2) The dual-entry lever 526 and the round-off lever 566 are placed in their operative positions.

(3) The carriage is lined up to enter fractional cents into the denominational order containing the round-off mechanism, in this case the 10th order. For this example the positioning of the carriage is accomplished by depressing the No. "4" tabulate key 360 (FIG. 1) and then depressing the clear-return key 220. This operation also causes a clearance cycle which brings the 10th order numeral wheel to the "5" position.

(4) Referring now to the tabulation of the problem above, the weight 759 is entered into the rightmost three keybanks of the machine and is, of course, simultaneously entered into the dual-entry mechanism into the leftmost three keybanks. The Nos. "1," "2" and "5" multiplier keys (on the extreme right in FIG. 1) are successively depressed to multiply the number of pounds by the rate. The product 9.4875 appears in the right side of the register. In listing this extension on the invoice the operator, of course, rounds this value off to 9.49. The same product also appears in the left side of the register automatically rounded off by virtue of the "7" combining with the "round-off" "5" in the 10th order to thus produce a carry to the 11th order.

(5) The clear-return key is now depressed to clear the value from the right half of the register, to return the "5" to the 10th order and to return the carriage to its tabulated position.

(6) Steps 4 and 5 are repeated for each individual extension with the automatically rounded off extensions accumulating to a grand total in the left half of the product register.

The accumulated total appearing in the left half of the register corresponds exactly to the sum of the extensions as rounded off and listed by the operator. Without round-off, the accumulated total is 38.9321, clearly not the desired value. It becomes clear that in order to obtain the correct accumulated total the individual extensions must be rounded off as they are accumulated. Of course, this may be done manually by entering a "5" in the 10th order at the beginning of the calculation of each extension, but such a procedure takes more time and the likelihood of error is increased than with a machine which embodies the features of the present invention.

The invention claimed is:

1. In a calculating machine having a keyboard comprising a plurality of ordinally arranged rows of value entry keys, the combination of: a differentially settable member associated with each row of keys and mounted for movement to a plurality of positions in response to depression of the respective keys associated therewith, a device operable in one of two positions thereof for connecting one of said members with a second one of said members to cause identical movement of the second member upon depression of a key associated with said first member, means for moving said device to connecting position, and a mechanism responsive to said moving means for preventing the depression of the keys associated with said second member.

2. A calculating machine according to claim 1 in which the connecting device includes means adjustable to eliminate lost motion between the two members.

References Cited in the file of this patent

UNITED STATES PATENTS

| 1,534,938 | Fournier | Apr. 21, 1925 |
| 1,793,155 | Britten | Feb. 17, 1931 |
| 2,334,431 | Moody | Nov. 16, 1943 |
| 2,367,421 | Muller | Jan. 16, 1945 |
| 2,422,103 | Lambert | June 10, 1947 |
| 2,617,594 | Gang | Nov. 11, 1952 |